United States Patent
Ohsawa

[19]
[11] Patent Number: 6,118,943
[45] Date of Patent: Sep. 12, 2000

[54] CAMERA

[75] Inventor: Toshifumi Ohsawa, Tokyo, Japan

[73] Assignee: Canon Kabushiki Kaisha, Tokyo, Japan

[21] Appl. No.: 09/003,465

[22] Filed: Jan. 5, 1998

Related U.S. Application Data

[63] Continuation of application No. 08/231,485, Apr. 22, 1994, abandoned.

[30] Foreign Application Priority Data

Apr. 28, 1993 [JP] Japan .................................. 5-123254

[51] Int. Cl.$^7$ ................................. G03B 13/36
[52] U.S. Cl. .......................... 396/51; 396/123
[58] Field of Search ................... 396/121, 122, 396/123, 51

[56] References Cited

U.S. PATENT DOCUMENTS

| | | | |
|---|---|---|---|
| 5,036,347 | 7/1991 | Tsunekawa et al. | 354/400 |
| 5,151,583 | 9/1992 | Tokunaga et al. | 250/201.2 |
| 5,182,443 | 1/1993 | Suda et al. | 250/201.2 |
| 5,214,466 | 5/1993 | Nagano et al. | 354/402 |
| 5,225,862 | 7/1993 | Nagano et al. | 354/62 |
| 5,245,371 | 9/1993 | Nagano et al. | 354/62 |
| 5,253,008 | 10/1993 | Konishi et al. | 354/402 |
| 5,280,312 | 1/1994 | Yamada et al. | 351/211 |
| 5,296,888 | 3/1994 | Yamada | 354/402 |
| 5,298,927 | 3/1994 | Konishi et al. | 351/211 |
| 5,317,629 | 5/1994 | Watanabe | 379/93 |
| 5,333,029 | 7/1994 | Uchiyama et al. | 354/410 |
| 5,365,302 | 11/1994 | Kodama | 354/403 |
| 5,386,253 | 1/1995 | Fielding | 348/745 |
| 5,418,594 | 5/1995 | Kusaka et al. | 354/402 |
| 5,422,700 | 6/1995 | Suda et al. | 354/402 |
| 5,428,420 | 6/1995 | Akashi et al. | 354/408 |
| 5,455,654 | 10/1995 | Suzuki | 354/402 |
| 5,485,241 | 1/1996 | Irie et al. | 354/410 |
| 5,486,892 | 1/1996 | Suzuki et al. | 354/402 |
| 5,508,759 | 4/1996 | Konishi et al. | 351/206 |
| 5,515,131 | 5/1996 | Ohmori et al. | 354/410 |
| 5,546,158 | 8/1996 | Konishi et al. | 354/410 |
| 5,579,078 | 11/1996 | Suzuki | 396/51 |
| 5,579,079 | 11/1996 | Yamada et al. | 396/51 |
| 5,598,248 | 1/1997 | Nagano et al. | 396/51 |
| 5,696,998 | 12/1997 | Yamada et al. | 396/51 |
| 5,708,862 | 1/1998 | Tsunekawa et al. | 396/51 |
| 5,712,684 | 1/1998 | Inoue et al. | 348/341 |

FOREIGN PATENT DOCUMENTS

| | | |
|---|---|---|
| 1-241511 | 9/1989 | Japan . |
| 1-288812 | 11/1989 | Japan . |
| 1-288813 | 11/1989 | Japan . |

*Primary Examiner*—W. B. Perkey
*Attorney, Agent, or Firm*—Fitzpatrick, Cella, Harper & Scinto

[57] ABSTRACT

A camera includes an objective lens, a detection device for detecting defocus associated with each of at least three portions in a view field, a setting device for manually setting whether the each of at least three portions is used for focusing or not and a selecting device for automatically selecting a portion from among a plurality of the manually set portions to have been used for focusing, and for performing focusing for the selected portion by the objective lens.

11 Claims, 12 Drawing Sheets

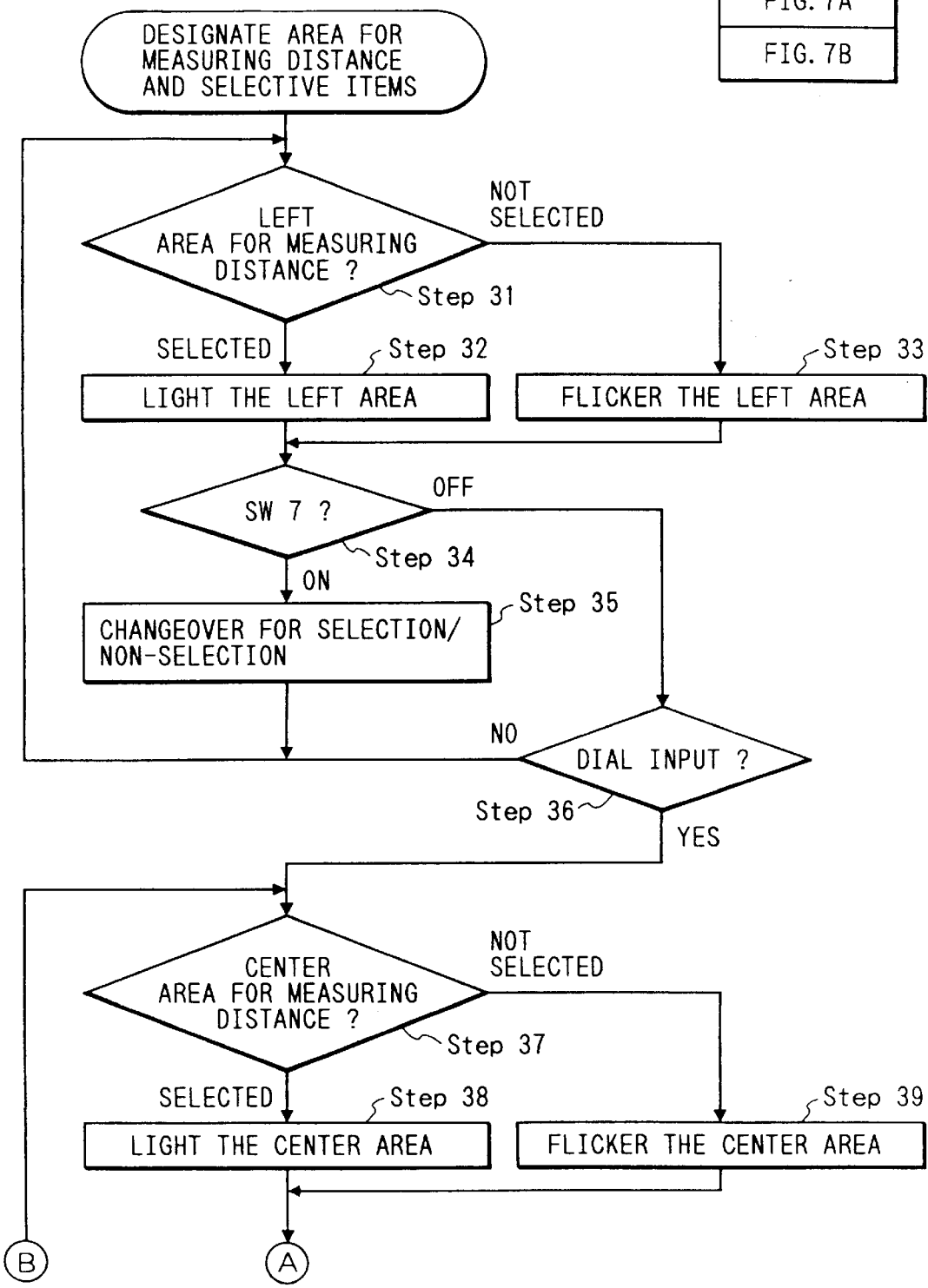

CAMERA

This application is a continuation of application Ser. No. 08/231,485, filed Apr. 22, 1994, now abandoned.

BACKGROUND OF THE INVENTION

1. Field of the Invention

The present invention relates to an improvement in an auto-focus camera which sets three or more areas in a photographing frame, and performs focus adjustment of a photographing lens on the basis of the defocus amount of an object in a selected one of these areas.

2. Related Background Art

In recent years, as an automatic focus detection apparatus for a camera, the following focus detection system is widely used. In this system, a light beam coming from an object and passing through different exit pupil areas (distance measuring areas) of a photographing lens is focused on a pair of line sensors, and a relative positional displacement amount between a pair of image signals obtained by photoelectrically converting object images formed on the line sensors is calculated, thereby detecting the defocus amount of an object. Furthermore, a system in which a plurality of focus selection systems are arranged to allow focus detection in a plurality of areas is also known. Of cameras having a plurality of focus detection systems, as a means for selecting a distance measuring area to be focused from the plurality of focus detection systems, a camera which automatically selects the area in accordance with a predetermined algorithm is known.

In order to control the above-mentioned auto-focus automation techniques to more faithfully reflect a photographer's will, a technique for detecting a position of a gazing point of a photographer in a finder, i.e., in a photographing frame, and selecting a distance measuring area to be focused on the basis of the visual axis (gazing point) detection result is also proposed.

Note that the camera which has a plurality of focus detection systems and automatically selects a distance measuring area to be focused from the plurality of focus detection systems in accordance with a predetermined algorithm is disclosed in Japanese Laid-Open Patent Application Nos. 1-288812, 1-288813, and the like. Also, the technique which has the visual axis detection means and applies it to the automation technique of a camera is disclosed in Japanese Laid-Open Patent Application No. 1-241511, and the like.

In the conventional camera which has a plurality of focus detection systems and automatically selects a distance measuring area to be focused from the plurality of focus detection systems, since the algorithm is designed to automatically select the area from all the distance measuring areas of the camera as selective items, a distance measuring area which is not intended by a photographer at all may be focused in some cases.

SUMMARY OF THE INVENTION

The present invention has been made in consideration of the above-mentioned problems, and has as its object to provide an improved camera.

According to the first aspect of the present invention, there is provided a camera comprising an objective lens for imaging an object, detection means for detecting a defocus amount associated with each of at least three portions of the object, means for selecting a plurality of portions, excluding at least one portion, from the three portions, and means for automatically selecting a given portion from the plurality of selected portions, and causing the objective lens to focus the given portion.

According to the second aspect of the present invention, there is provided a camera comprising an objective lens for imaging an object, detection means for detecting a defocus amount associated with each of at least three portions of the object, means for selecting a plurality of portions, excluding at least one portion, from the three portions, and means for automatically selecting a given portion from the plurality of selected portions in accordance with an algorithm stored in a memory, and causing the objective lens to focus the given portion.

According to the third aspect of the present invention, there is provided an image pick-up device comprising an imaging optical system, detection means for detecting a defocus amount associated with each of at least three portions of the object, means for selecting a plurality of portions, excluding at least one portion, from the three portions, and focusing means for automatically selecting a given portion from the plurality of selected portions, and causing the optical system to focus the given portion.

DETAILED DESCRIPTION OF THE PREFERRED EMBODIMENT

Figure 1:
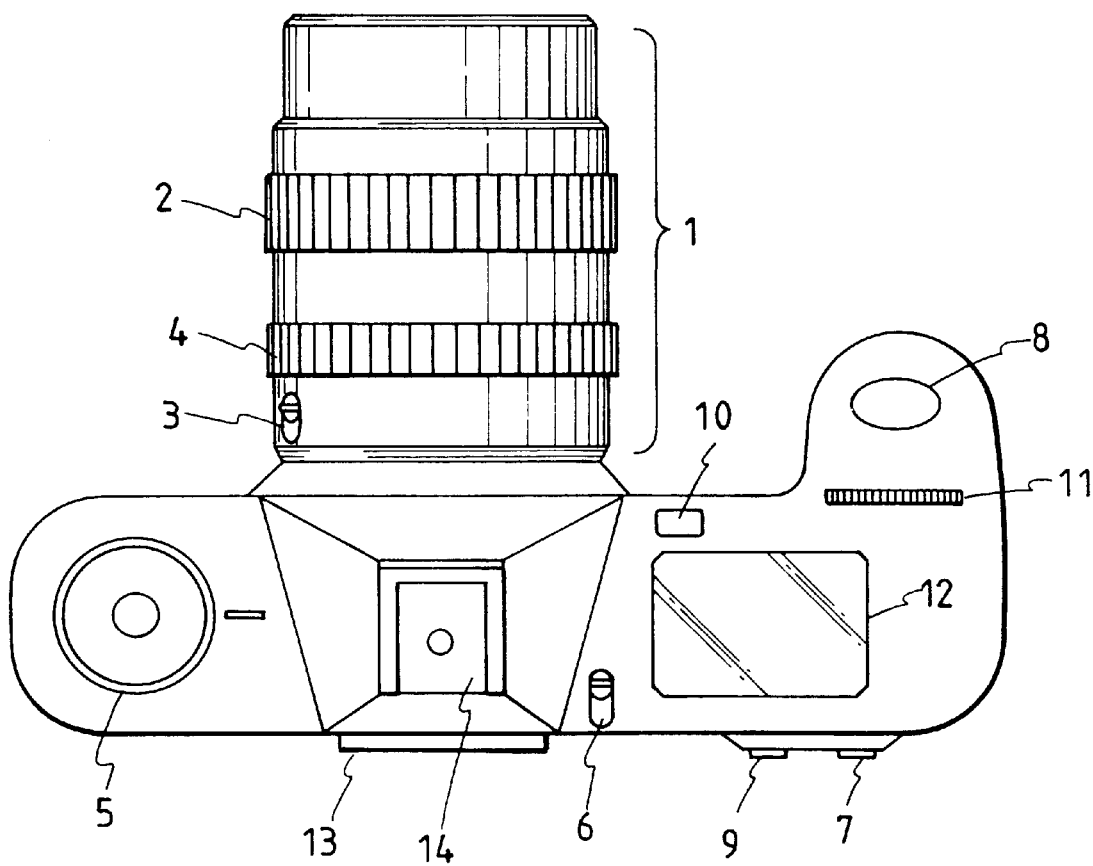
FIG. 1 is a top view of an auto-focus camera according to an embodiment of the present invention.

FIG. 1 is a top view of an auto-focus camera according to an embodiment of the present invention.

Referring to FIG. 1, a photographing lens 1 has the following operation members, and the like.

A zoom ring 2 is operated to manually change the focal length of the photographing lens 1.

A switch 3 is used for switching between an auto-focus mode and a manual focus mode.

A focus ring 4 is operated to manually perform focus adjustment of the photographing lens 1 when the manual focus mode is selected upon operation of the switch 3.

A camera main body has the following operation members, and the like.

A selector 5 is used for selecting an operation mode of a camera. For example, a manual photographing mode, a full-automatic photographing mode, and the like are selected using the selector 5.

A switch 6 is used for setting whether a distance measuring area automatic selection means is selected as one for a visual axis detection means or not (to be described later).

A switch 7 is used for changing an area for measuring a distance (to be referred to as a distance measuring area hereinafter). When an input dial 11 (to be described later) is operated while pressing the switch 7, the distance measuring area is cyclically switched like "right distance measuring area"→"central distance measuring area"→"left distance measuring area"→"distance area auto-selection"→ . . . .

A release switch 8 comprises a two-stroke switch. A release standby mode is set at the first stroke position of the release switch 8, and a release operation is started at the second stroke position of the switch 8.

A switch 9 is used for setting an exposure correction amount.

A switch 10 is used for setting a distance measuring area selective item in a distance measuring area (distance measuring point) auto-selection mode (details of which will be described later).

A dial 11 generates two-phase pulses when it is rotated. The dial 11 is used for setting and changing various kinds of information associated with the photographing operation of the camera.

The camera main body also comprises an external display 12 for displaying various kinds of information associated with the photographing operation of the camera, a finder eyepiece portion 13, and an accessory shoe 14.

Figure 2A:
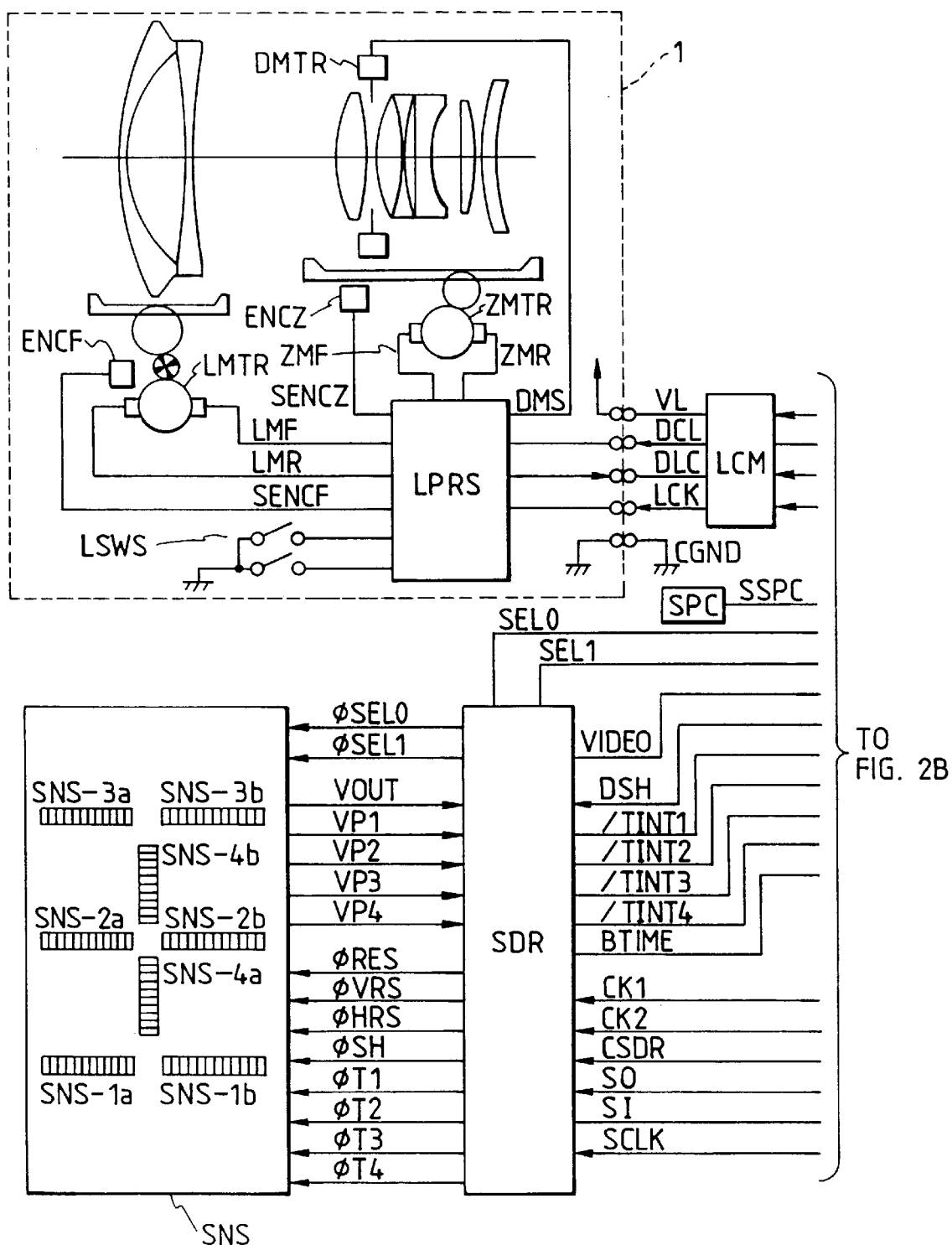
FIG. 2 is comprised of FIG. 2A and FIG. 2B, which are block diagrams showing the circuit arrangement for the auto-focus camera shown in FIG. 1.
Figure 2B:
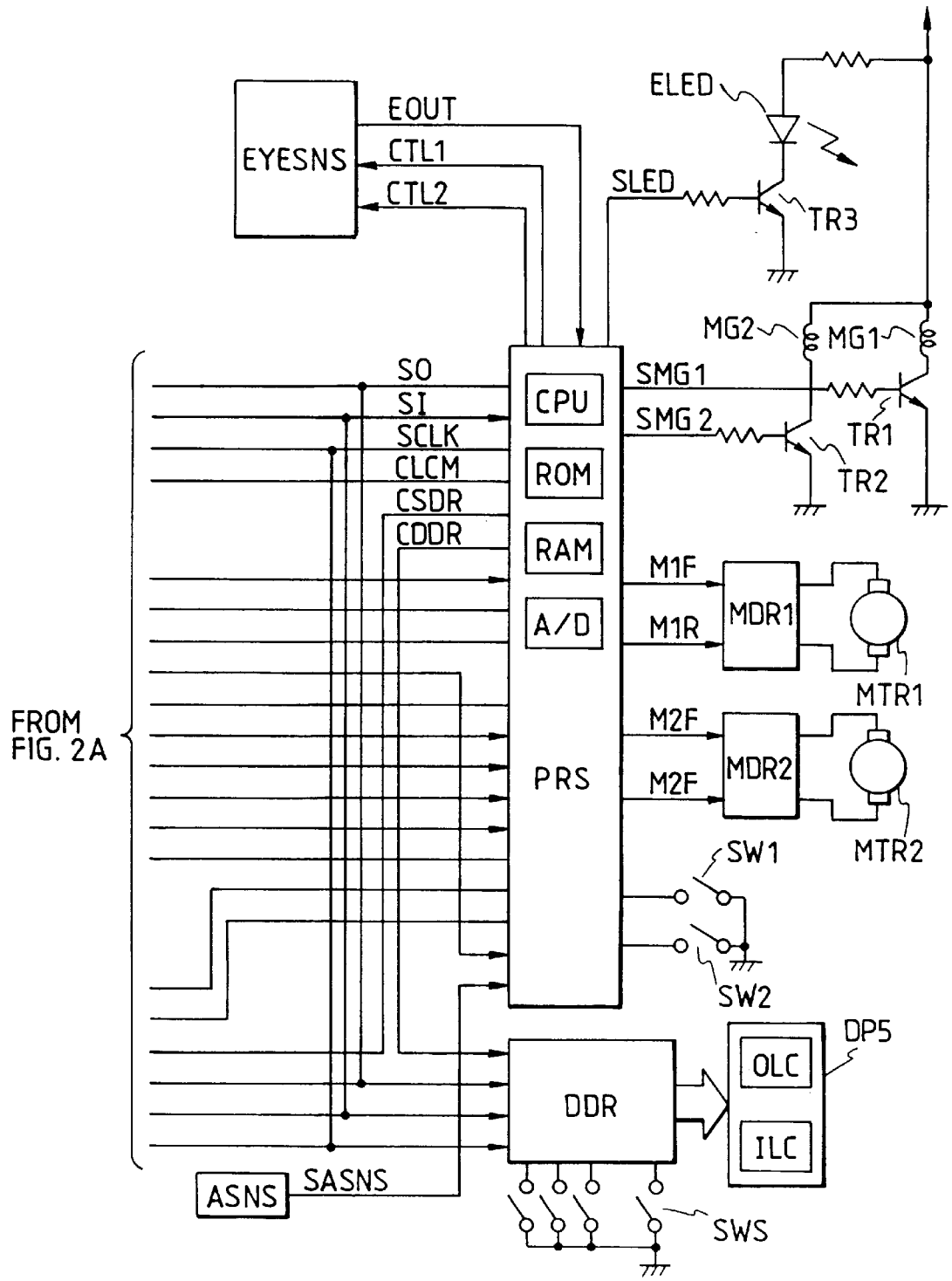

FIGS. 2A and 2B are block diagrams showing the detailed circuit arrangement of the camera shown in FIG. 1.

Referring to FIGS. 2A and 2B, a controller PRS for the camera is a one-chip microcomputer which includes a CPU (central processing unit), a ROM, a RAM, and an A/D conversion function. The microcomputer PRS executes a series of operations of the camera such as an automatic exposure control function, an automatic focus adjustment function, a film wind-up/rewind function, and the like, in accordance with a sequence program of the camera stored in the ROM. For this purpose, the microcomputer PRS communicates with peripheral circuits in the camera main body, and an intra-lens controller using communication signals SO, SI, and SCLK, and communication selection signals CLCM, CSDR, and CDDR, thereby controlling the operations of various circuits and the lens 1.

Note that the signal SO is a data signal output from the microcomputer PRS, the signal SI is a data signal input to the microcomputer PRS, and the signal SCLK is a synchronization clock for the signals SO and SI.

A lens communication buffer circuit LCM supplies electric power to a lens power supply terminal VL when the camera is in operation. The circuit LCM also serves as a communication buffer between the camera and the lens 1 when the selection signal CLCM from the microcomputer PRS is at a high potential level (to be abbreviated as "H" hereinafter; a low potential level will be abbreviated as "L" hereinafter).

When the microcomputer PRS sets the selection signal CLCM at "H", and outputs predetermined data as the signal SO in synchronism with the clock SCLK, the buffer circuit LCM outputs buffer signals LCK and DCL of the signals SCLK and SO to the lens via a camera-lens contact. At the same time, the buffer circuit LCM outputs a buffer signal of a signal DLC from the photographing lens 1 as the signal SI, and the microcomputer PRS receives the signal SI as data from the lens 1 in synchronism with the clock SCLK.

A switch detection & display circuit DDR is selected when the signal CDDR is at "H", and is controlled by the microcomputer PRS using the signals SO, SI, and SCLK. More specifically, the circuit DDR switches a display mode of a display member DPS (comprising an external display OLC and an internal display ILC) on the basis of data supplied from the microcomputer PRS, and informs the ON/OFF states of various operation members of the camera to the microcomputer PRS via communications.

Switches SW1 and SW2 are interlocked with the above-mentioned release button (or switch) 8. The switch SW1 is turned on at the first stroke position of the release button 8, and the switch SW2 is turned on at the subsequent second stroke position of the release button 8. The microcomputer PRS performs photometry and automatic focus adjustment in response to the ON operation of the switch SW1, and performs exposure control and the subsequent film wind-up operation in response to the ON operation of the switch SW2 as a trigger.

A motor MTR1 is used for feeding a film, and a motor MTR2 is used for moving a mirror upward and downward, and charging a shutter spring. The forward/reverse rotations of these motors MTR1 and MTR2 are respectively controlled by driving circuits MDR1 and MDR2. Signals M1F, M1R, M2F, and M2R supplied from the microcomputer PRS to the driving circuits MDR1 and MDR2 are motor control signals.

Magnets MG1 and MG2 are respectively used for initiating the traveling operations of the shutter front and rear curtains. These magnets MG1 and MG2 are energized by signals SMG1, SMG2, and amplifying transistors TR1 and TR2, and shutter control is executed by the microcomputer PRS.

Note that the switch detection & display-circuit DDR, the motor driving circuits MDR1 and MDR2, and shutter control are not directly related to the present invention, and a detailed description thereof will be omitted.

A light-emitting diode ELED serves as a light source for illuminating an eyeball of a photographer with infrared rays so as to detect the visual axis of the photographer who looks into the finder of the camera. The diode ELED is energized by a transistor TR3. The transistor TR3 receives a control signal SLED supplied from the microcomputer PRS.

A photoelectric conversion device EYESNS receives light reflected by the eyeball of the photographer illuminated with light from the light-emitting diode ELED. The device EYESNS receives an optical image of the eyeball of the photographer by an array of a large number of sensors as an electrical signal, and obtains image data for using a calculation of the direction of the visual axis of the photographer. Photoelectric conversion control of the-photoelectric conversion device EYESNS is performed based on control signals CTL1 and CTL2 supplied from the microcomputer PRS, and the device EYESNS outputs an image data signal from a terminal EOUT. The microcomputer PRS accesses the optical image data, and executes processing for calculating the direction of the visual axis.

A photometry sensor SPC for exposure control receives light reflected by an object via the photographing lens 1. An output SSPC from the sensor SPC is input to the analog input terminal of the microcomputer PRS, and is used in automatic exposure control in accordance with a predetermined program after A/D conversion.

An angular velocity sensor ASNS is used for detecting a vibration of the camera. An output SASNS from the sensor ASNS is input to the microcomputer PRS, and is A/D-converted into a digital signal. The digital signal is used as data for detecting if a photographer is certainly taking a photographing preparation position by holding the camera, as will be described later.

A lens microcomputer LPRS receives the signal DCL in synchronism with a signal LCK as command data from the camera to the photographing lens 1. Lens operations corresponding to commands are predetermined. The lens microcomputer LPRS analyzes the received command in accordance with a predetermined protocol. Then, the lens microcomputer LPRS performs focus adjustment and diaphragm control operations, and outputs the operating states of the respective units of the lens (the driving state of the focus adjustment optical system, the driving state of a diaphragm, and the like), various parameters (open f-number, a focal length, a coefficient for the defocus amount vs. the moving amount of the focus adjustment optical system, and the like), the operating states of the operation switches (SWAM and SWLTC) of the lens, and the like.

This embodiment exemplifies a case wherein the lens 1 comprises a zoom lens. When a focus adjustment command is sent from the camera, a focus adjustment motor LMTR is driven by signals LMF and LMR in accordance with the driving amount and direction simultaneously sent from the camera, and the focus adjustment optical system is moved in the optical axis direction, thus performing focus adjustment. The moving amount of the optical system is monitored based on pulse signals SENCF from an encoder circuit ENCF which detects a pattern of a pulse plate rotated in synchronism with the movement of the optical system, and outputs pulses corresponding in number to the moving amount. An internal counter of the lens microcomputer LPRS counts the pulse signals SENCF, and the microcomputer LPRS itself sets the signals LMF and LMR at "L" so that the count value coincides with the moving amount sent to the microcomputer LPRS, thereby controlling the motor LMTR.

For this reason, once the focus adjustment command is sent from the camera, the microcomputer PRS as the controller for the camera does not participate in the lens driving operation at all until the lens driving operation ends. Upon reception of a request from the camera, the contents of the counter can be supplied to the camera.

When a diaphragm control command is sent from the camera, a stepping motor (not shown) which is known as a diaphragm driving motor is driven in accordance with a stop-down count simultaneously sent from the camera. Note that since the stepping motor can be open-controlled, no encoder for monitoring the operation of the stepping motor is required.

When a zoom driving command is sent from the camera, a zoom driving motor ZMTR is driven by signals ZMF and ZMR in accordance with the focal length position simultaneously sent from the camera. The position of a zoom optical system is detected by an absolute position encoder circuit ENCZ attached thereto, and the lens microcomputer LPRS detects the zoom position on the basis of a signal SENCZ received from the encoder circuit ENCZ. When the zoom position has reached a target position, the microcomputer LPRS itself sets the signals ZMF and ZMR at "L" to control the motor ZMTR. For this reason, once the zoom driving command is sent from the camera, the microcomputer PRS as the controller for the camera need not participate in the zoom lens driving operation at all until the zoom lens driving operation ends. Furthermore, the encoder circuit ENCZ can output a signal when the zoom lens is to be manually moved. The lens microcomputer LPRS stores lens parameters at the respective zoom positions, and sends parameters corresponding to the current zoom position in response to a request received from the camera microcomputer PRS.

A driving circuit SDR is used for driving a focus detection sensor device SNS. The driving circuit SDR is selected when the signal CSDR is at "H", and is controlled by the microcomputer PRS using the signals SO, SI, and SCLK.

Signals $\phi$SEL0 and $\phi$SEL1 supplied from the driving circuit SDR to the sensor device SNS are signals SEL0 and SEL1 from the microcomputer PRS. These signals $\phi$SEL0 and $\phi$SEL1 are used for selecting a sensor array pair SNS-1 (SNS-1$a$ and SNS-1$b$) when $\phi$SEL0="L" and $\phi$SEL1="L"; a sensor array pair SNS-4 (SNS-4$a$ and SNS-4$b$) when $\phi$SEL0="H" and $\phi$SEL1="L"; a sensor array pair SNS-2 (SNS-2$a$ and SNS-2$b$) when $\phi$SEL0="L" and $\phi$SEL1="H"; and a sensor array pair SNS-3 (SNS-3$a$ and SNS-3$b$) when $\phi$SEL0="H" and $\phi$SEL1="H".

Upon completion of accumulation, when the signals SEL0 and SEL1 are properly set, and thereafter, clocks $\phi$SH and $\phi$HRS are sent, image signals from the sensor array pair selected by the signals SEL0 and SEL1 ($\phi$SEL0 and $\phi$SEL1) are sequentially serially output from an output VOUT.

Signals VP1, VP2, VP3, and VP4 are monitor signals from object luminance monitor sensors which are I-respectively arranged adjacent to the sensor array pairs SNS-1 (SNS-1$a$ and SNS-1$b$), SNS-2 (SNS-2$a$ and SNS-2$b$), SNS-3 (SNS-3$a$ and SNS-3$b$), and SNS-4 (SNS-4$a$ and SMS-4$b$). The voltages of these signals increase simultaneously with the beginning of accumulation, thereby performing accumulation control of the respective sensor arrays.

Signals $\phi$RES and $\phi$VRS are reset clocks, signals $\phi$HRS and $\phi$SH are read clocks of an image signal, and signals $\phi$T1, $\phi$T2, $\phi$T3, and $\phi$T4 are clocks for terminating accumulation of the corresponding sensor array pairs.

An output VIDEO from the sensor driving circuit SDR is an image signal which is obtained by calculating a difference between the image signal VOUT from the sensor device SNS and a dark current output, and amplifying the difference with a gain determined by the luminance of an object. The dark current output is an output value from a light-shielded pixel in the sensor array. The driving circuit SDR holds this dark current output in its capacitor in accordance with a signal DSH from the microcomputer PRS, and amplifies the difference between the held value and the image signal. The output VIDEO is input to the analog input terminal of the microcomputer PRS. The microcomputer PRS A/D-converts the signal VIDEO, and sequentially stores the converted digital value at predetermined addresses on the RAM.

Signals /TINTE1, /TINTE2, /TINTE3, and /TINTE4 are signals indicating that accumulation ends since a proper exposure level is attained by electrical charges accumulated on the sensor array pairs SNS-1 (SNS-1$a$ and SNS-1$b$), SNS-2 (SNS-2$a$ and SNS-2$b$), SNS-3 (SNS-3$a$ and SNS-3$b$), and SNS-4 (SNS-4$a$ and SNS-4$b$). Upon reception of these signals, the microcomputer PRS executes read processing of an image signal.

A signal BTIME is a signal for defining a determination timing of the read gain of an image signal amplifier in the sensor driving circuit SDR. Normally, when the signal BTIME goes "H", the circuit SDR determines the read gain of the corresponding sensor pair on the basis of the voltages of the monitor signals VP1 to VP4.

Signals CK1 and CK2 are reference clocks supplied from the microcomputer PRS to the sensor driving circuit SDR so as to generate the clocks φRES, φVRS, φHRS, and φSH.

When the microcomputer PRS sets the communication selection signal CSDR at "H", and outputs a predetermined "accumulation start command" to the sensor driving circuit SDR, the accumulation operation of the sensor device SNS is started.

Thus, the four sensor array pairs photoelectrically convert object images formed on the corresponding sensors, and charges are accumulated on photoelectric conversion element units of the sensors. At the same time, the voltages of the signals VP1 to VP4 from the luminance monitor sensors of the sensor array pairs increase, and when the voltages have reached a predetermined level, the sensor driving circuit SDR independently sets the signals /TINTE1 to /TINTE4 at "L".

Upon reception of these signals, the microcomputer PRS outputs a predetermined waveform as the clock CK2. The sensor driving circuit SDR generates the clocks φSH and φHRS on the basis of the clock CK2, and supplies the generated clocks to the sensor device SNS. The sensor device SNS outputs an image signal in response to the clocks. The microcomputer PRS A/D-converts the output VIDEO input to its analog input terminal by the internal A/D conversion function in synchronism with the clock CK2 output therefrom, and sequentially stores the converted digital signal at predetermined addresses on the RAM.

In this manner, the microcomputer PRS receives image information of an object image formed on the sensor array pairs, and thereafter, performs a predetermined focus detection calculation, thereby detecting the defocus amount of the photographing lens 1.

Note that, in the above-mentioned arrangement, the photoelectric conversion device EYESNS including the visual axis detection sensor, and the light-emitting diode correspond to the visual axis detection means.

Figure 3:
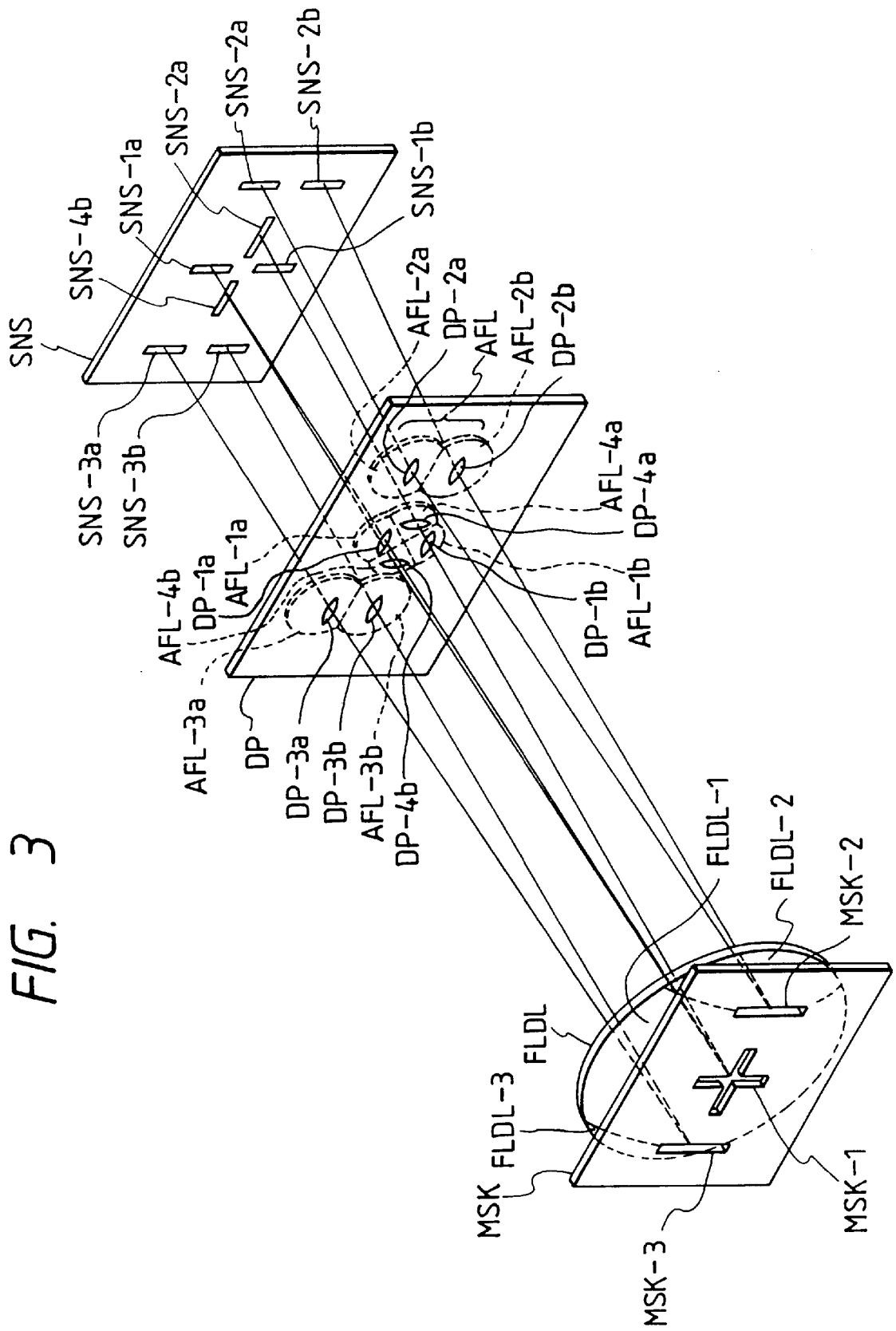
FIG. 3 is an exploded perspective view of a focus detection optical system in the auto-focus camera shown in FIG. 1.

FIG. 3 is a perspective view for explaining the arrangement of the focus detection optical system arranged in the camera shown in FIG. 1.

Referring to FIG. 3, a field mask MSK has a cross-shaped aperture portion MSK-1 at its central portion, and vertically elongated aperture portions MSK-2 and MSK-3 at its two end portions. A field lens FLDL is constituted by three portions FLDL-1, FLDL-2, and FLDL-3 in correspondence with the three aperture portions MSK-1, MSK-2, and MSK-3 of the field mask.

A diaphragm DP has two pairs of apertures, i.e., a total of four, upper, lower, right, and left apertures DP-1a, DP-1b, DP-4a, and DP-4b at its central portion, and two pairs of apertures DP-2a and DP-2b, and DP-3a and DP-3b at its right and left end portions. The respective regions FLDL-1, FLDL-2, and FLDL-3 of the field lens FLDL have a function for forming optical images of these aperture pairs DP-1 and DP-4, DP-2, and DP-3 near the exit pupil of an objective lens (not shown).

A secondary focusing lens AFL consists of four pairs, i.e., a total of eight lenses AFL-1a, AFL-1b, AFL-4a, AFL-4b, AFL-2a, AFL-2b, AFL-3a, and AFL-3b, and is arranged behind the diaphragm DP in correspondence with the apertures of the diaphragm DP.

The focus detection sensor device SNS comprises four pairs, i.e., a total of eight sensor arrays SNS-1a, SNS-1b, SNS-4a, SNS-4b, SNS-2a, SNS-2b, SNS-3a, and SNS-3b, and these sensor arrays are arranged to receive optical images in correspondence with the secondary focusing lenses AFL.

In the focus detection optical system shown in FIG. 3, when the focal point of the photographing lens 1 is present in front of a film surface, object images formed on the sensor array pairs are close to each other; when the focal point is present behind the film surface, object images are separated away from each other. Since the relative positional displacement amount of these object images has a specific functional relationship with an out-of-focus amount of the photographing lens 1, when the sensor array pairs perform proper calculations for their sensor outputs, the out-of-focus amount, i.e., a so-called defocus amount, of the photographing lens 1 can be detected.

With the above-mentioned arrangement, a distance measuring operation can be performed for an object located near the center of a field photographed or observed through the photographing lens 1 (objective lens) and even for objects located at positions corresponding to the aperture portions MSK-2 and MSK-3 at the end portions of the field mask other than the central portion.

Figure 4:
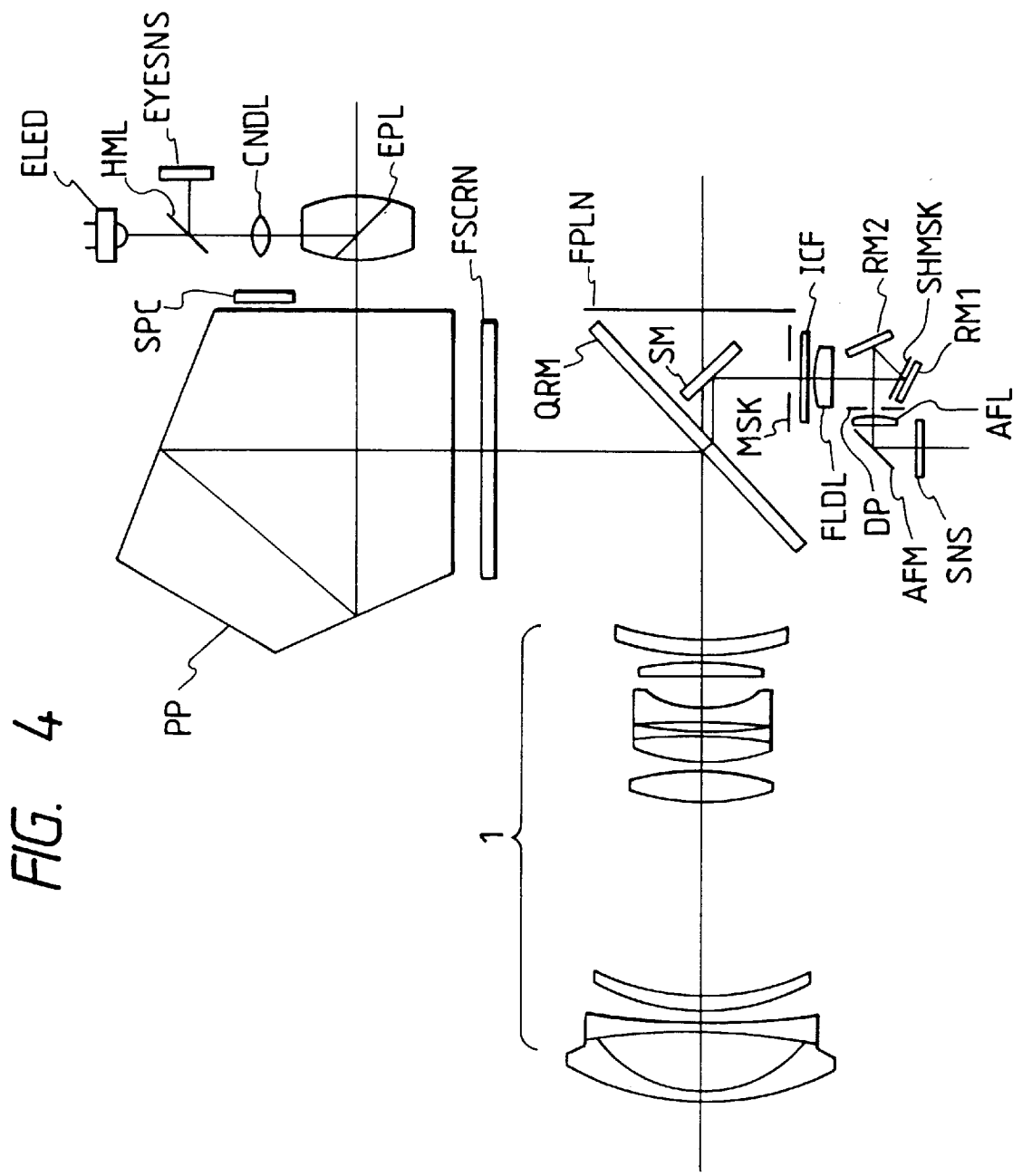
FIG. 4 is a diagram showing the optical arrangement for the auto-focus camera shown in FIG. 1.

FIG. 4 shows the optical arrangement when the focus detection apparatus with the focus detection optical system (FIG. 3) and the like is arranged in the camera.

Referring to FIG. 4, the camera comprises a photographing lens 1, a quick return mirror QRM, a focusing screen FSCRN, a pentagonal prism PP, an eyepiece lens EPL, a film surface FPLN, a sub mirror SM, the field mask MSK, an infrared beam cut filter ICF, the field lens FLDL, first and second reflection mirrors RM1 and RM2, a light-shielding mask SHMSK, the diaphragm DP, the secondary focusing lens AFL, a reflection mirror AFM, and the above-mentioned focus detection sensor device SNS.

The following visual axis detection system is arranged on the upper surface of the camera.

That is, the visual axis detection system includes the eyepiece lens EPL including a dichroic mirror for splitting a light beam path, a condenser lens CNDL, a half mirror HML for splitting a light beam path, the above-mentioned photoelectric conversion device EYESNS comprising the visual axis detection sensor, the above-mentioned light-emitting diode as an illumination light source for visual axis detection, and the above-mentioned photometry sensor SPC for performing exposure control of the camera.

The operation of the microcomputer PRS will be described below with reference to the flow charts in FIGS. 5 to 8.

Figure 5:
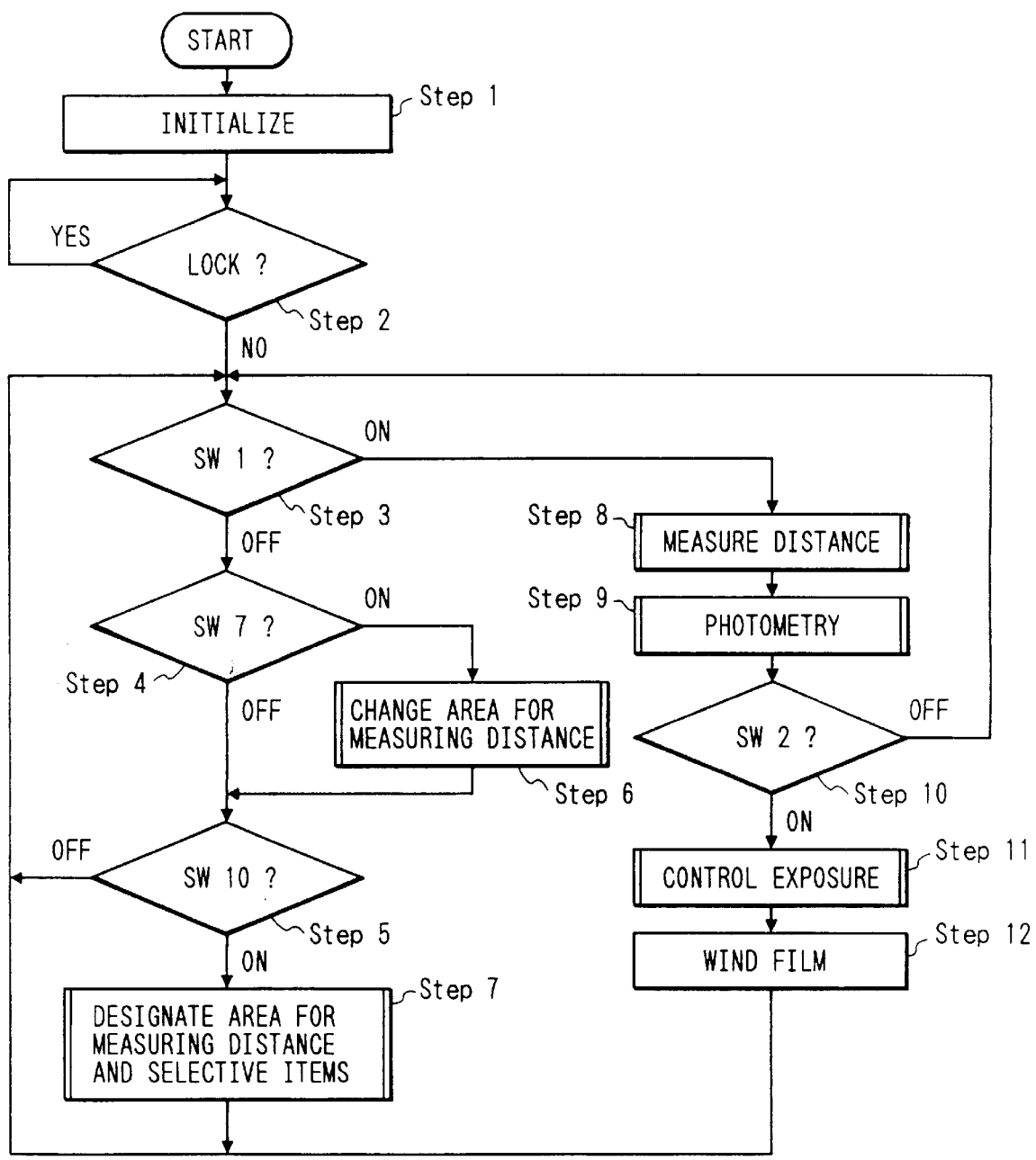
FIG. 5 is a flow chart showing the main operation of the auto-focus camera in the embodiment of the present invention.

When a battery is loaded in the camera, and a power switch (not shown) is turned on, the microcomputer PRS starts its operation from step 1 in FIG. 5.

[Step 1] The microcomputer PRS initializes flags in its internal memory, and input/output ports. Selective items of distance measuring areas (to be described later) are initialized to a state wherein all the selective items are selected.

[Step 2] The microcomputer PRS communicates with the switch detection & display circuit DDR to read out information of a selector MODESEL for setting the operation mode of the camera, thereby checking if the operation mode of the camera is a release inhibition (LOCK) mode. If YES in step 2, the flow repeats step 2. However, if NO in step 2, the flow advances to step 3.

[Step 3] The microcomputer PRS communicates with the switch detection & display circuit DDR to check if the first stroke switch SW1 of the release switch 8 is ON. If the switch SW1 is OFF, the flow advances to step 4.

[Step 4] The microcomputer PRS communicates with the switch detection & display circuit DDR to check if the switch 7 for changing the distance measuring area is ON. If the switch 7 is OFF, the flow advances to step 5.

[Step 5] The microcomputer PRS communicates with the switch detection & display circuit DDR to check if the switch 10 used upon designation of the selective items of the distance measuring areas in the distance measuring area auto-selection mode is ON. As a result of checking, if the switch 10 is OFF, the flow returns to step 3.

As described above, when the respective switches are OFF, a routine from step 3 to step 5 is repeated. During this routine, if the switch 7 for changing the distance measuring area is turned on, the ON operation of the switch 7 is detected in step 4 above, and the flow then advances to step 6.

[Step 6] Since the switch 7 for changing the distance measuring area is turned on, a distance measuring area change routine is executed.

The distance measuring area change routine will be described below with reference to the flow chart in FIG. 6.

[Step 21] The microcomputer PRS communicates with the switch detection & display circuit DDR to switch the display contents of the display DPS to those in the distance measuring area setting mode. Thus, the currently selected distance measuring area is displayed.

[Step 22] The microcomputer PRS communicates with the switch detection & display circuit DDR to read the pulse input value from the dial 11.

[Step 23] The microcomputer PRS changes the distance measuring area in accordance with the pulse input value read in step 22.

[Step 24] The microcomputer PRS checks if the switch 7 for changing the distance measuring area is ON. If the switch 7 is kept ON, the flow returns to step 21 to repeat the above-mentioned flow. However, if the switch 7 is OFF, the flow returns to step 5 in FIG. 5 described above, and the distance measuring area change routine ends.

FIGS. 9A to 9D show display examples in the distance measuring area setting mode.

FIGS. 9A, 9B, 9C, and 9D show the display contents on the external liquid crystal display member or in the finder.

Figure 9A:
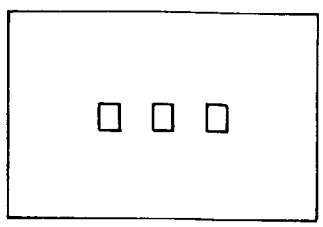
FIGS. 9A to 9G are views showing examples of a display in a finder, e.g., in a distance measuring area setting mode when the camera according to the embodiment of the present invention has three distance measuring areas.

For example, assuming that the distance measuring area auto-selection mode is selected, the contents shown in FIG. 9A are displayed. When the dial 11 is rotated clockwise by one click in this state, the distance measuring area is switched to the left distance measuring area, and the displayed contents are switched to those in FIG. 9B. When the dial 11 is rotated by another click, the central distance measuring area is selected, and the displayed contents are switched to those in FIG. 9C. Similarly, when the dial 11 is rotated clockwise each time by one click, the distance measuring area is switched in the order of "automatic"→"left distance measuring area"→"central distance measuring area"→"right distance measuring area"→"automatic". When the dial 11 is rotated counterclockwise, the distance measuring area is switched in the reverse order.

Note that designation of the selective items and their display examples in the distance measuring area auto-selection mode will be described in the following description of step 7.

When the switch 10 for setting the selective items of the distance measuring areas is turned on during repetition of step 3→step 4→step 6 (steps 21 to 24)→step 5 or step 3→step 4→step 5, the flow advances from step 5 to step 7.

[Step 7] Since the switch 10 for setting the selective items of the distance measuring areas is turned on, a routine for designating distance measuring area selective items in the distance measuring area auto-selection mode is executed.

Figure 7B:
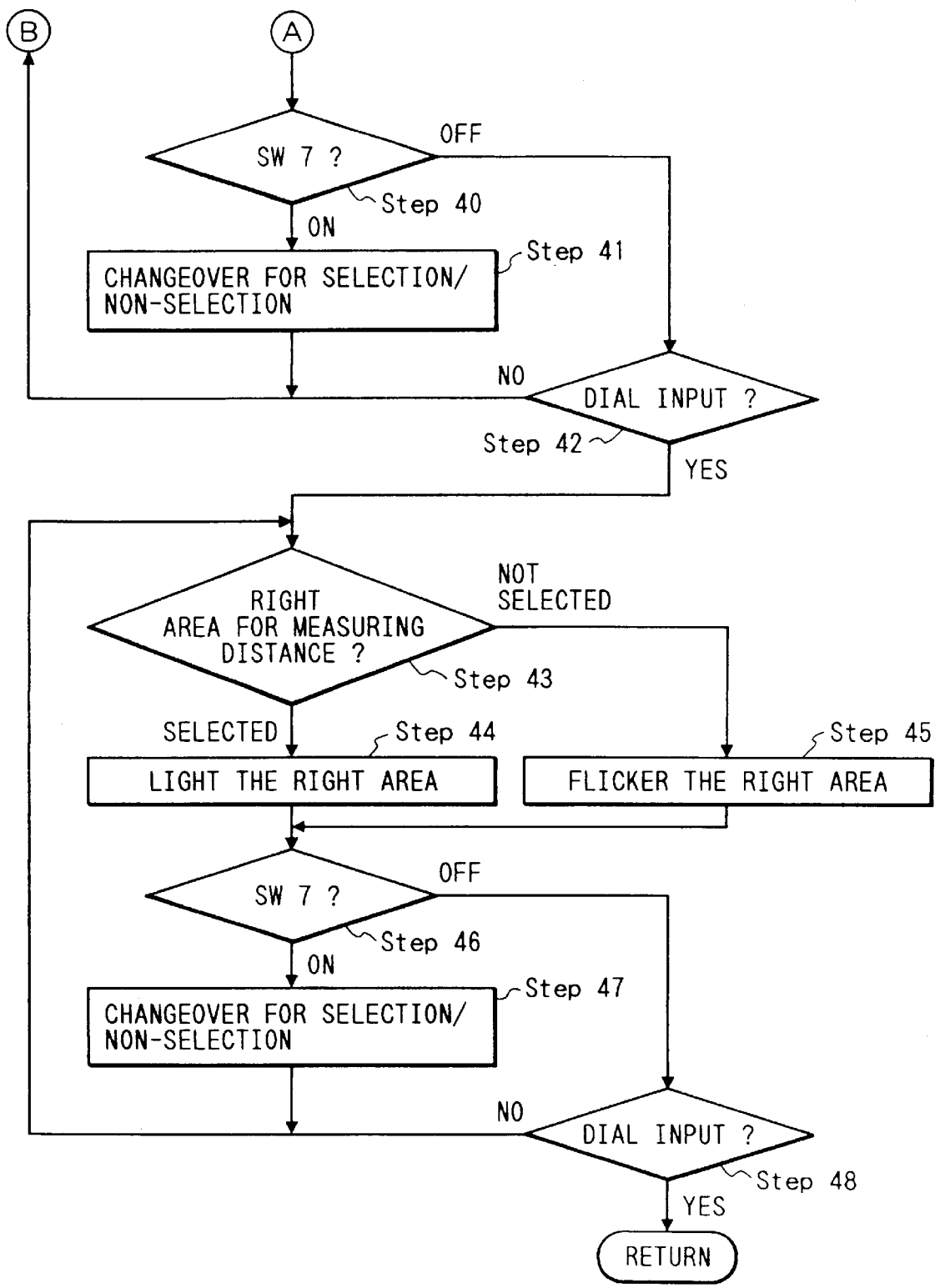
FIG. 7 is comprised of FIG. 7A and FIG. 7B, which are flow charts showing the operation for designating a selective item of a distance measuring area in step 7 in FIG. 5.

The routine for designating distance measuring area selective items will be described below with reference to the flow charts in FIGS. 7A and 7B.

[Step 31] The microcomputer PRS checks if the left distance measuring area stored in a memory is selected to be a distance measuring area selective item in the distance measuring area auto-selection mode. If the selective items are initialized to a state wherein all the distance measuring areas are selected in step 1, the flow advances to step 32.

[Step 32] The microcomputer PRS communicates with the switch detection & display circuit DDR to switch the display contents of the display DPS, thereby lighting only the left distance measuring area. Thus, the display contents of the display DPS are switched to those shown in FIG. 9B.

If the left distance measuring area is not selected to be a distance measuring area selective item in the distance measuring area auto-selection mode, the flow advances from step 31 to step 33.

[Step 33] The microcomputer PRS communicates with the switch detection & display circuit DDR to switch the display contents of the display DPS, thereby flickering only the left distance measuring area. Thus, the display contents of the display DPS are switched to those shown in FIG. 9E.

As can be seen from the above description, if the left distance measuring area is selected to be a distance measuring area selective item in the distance measuring area auto-selection mode, the left area is lighted; if the left area is not selected, it is flickered, and is distinguished from the selected area. The flow then advances to step 34.

[Step 34] The microcomputer PRS communicates with the switch detection & display circuit DDR to check if the switch 7 for selecting a distance measuring area is ON. In this state, the switch 7 for selecting a distance measuring area serves as a switch for changing over whether the corresponding distance measuring area is selected or not selected to be a distance measuring area selective item. If the switch 7 for selecting a distance measuring area is turned on (if a change-over instruction for selection/non-selection of the left distance measuring area is input), the flow advances to step 35.

[Step 35] When the left distance measuring area stored in the internal memory of the microcomputer PRS is selected to be a distance measuring area selective item in the distance measuring area auto-selection mode, the microcomputer PRS reverses its storage contents to "non-selection"; when it is not selected, the microcomputer PRS reverses its storage contents to "selection". Thereafter, the flow returns to step 31.

When the flow returns to step 31, the above-mentioned routine is repeated, and the display state of the left distance measuring area is changed based on the contents changed in step 35. That is, if the left area is selected to be a distance measuring area selective item in the distance measuring area auto-selection mode, it is lighted; if the left area is not selected, it is flickered.

As can be seen from the above description, whether or not the left distance measuring area is selected to be a distance measuring area selective item in the distance measuring area auto-selection mode can be changed over.

If the switch 7 is not turned on in step 34, it is determined that no change-over instruction for selection/non-selection of the left distance measuring area is input, and the flow advances to step 36.

[Step 36] The microcomputer PRS communicates with the switch detection & display circuit DDR to read the pulse input value from the dial 11. If no pulse input value is available, the flow returns to step 31 to repeat the above-mentioned routine for changing over whether the left distance measuring area is selected or not selected to be a distance measuring area selective item in the distance measuring area auto-selection mode. However, if the pulse input value is available, the flow advances to step 37 to execute a routine for changing over whether the central distance measuring area is selected or not selected to be a distance measuring area selective item in the distance measuring area auto-selection mode.

[Step 37] The microcomputer PRS checks if the central distance measuring area stored in the memory is selected to be a distance measuring area selective item in the distance measuring area auto-selection mode. If the central distance measuring area is selected, the flow advances to step 38.

[Step 38] The microcomputer PRS communicates with the switch detection & display circuit DDR to switch the display contents of the display DPS, thereby lighting only the central distance measuring area.

If the central distance measuring area is not selected to be a distance measuring area selective item in the distance measuring area auto-selection mode, the flow advances from step 37 to step 39.

[Step 39] The microcomputer PRS communicates with the switch detection & display circuit DDR to switch the display contents of the display DPS, thereby flickering only the central distance measuring area.

As can be seen from the above description, if the central distance measuring area is selected to be a distance measuring area selective item in the distance measuring area auto-selection mode, the central area is lighted; if the central area is not selected, it is flickered, and is distinguished from the selected area. The flow then advances to step 40.

[Step 40] The microcomputer PRS communicates with the switch detection & display circuit DDR to check if the switch 7 for selecting a distance measuring area is ON. In this state, the switch 7 for selecting a distance measuring area serves as a switch for changing over whether the corresponding distance measuring area is selected or not selected to be a distance measuring area selective item. If the switch 7 for selecting a distance measuring area is turned on (if a change-over instruction for selection/non-selection of the central distance measuring area is input), the flow advances to step 41.

[Step 41] When the central distance measuring area stored in the internal memory of the microcomputer PRS is selected to be a distance measuring area selective item in the distance measuring area auto-selection mode, the microcomputer PRS reverses its storage contents to "non-selection"; when it is not selected, the microcomputer PRS reverses its storage contents to "selection". Thereafter, the flow returns to step 37.

When the flow returns to step 37, the above-mentioned routine is repeated, and the display state of the central distance measuring area is changed based on the contents changed in step 41. That is, if the central area is selected to be a distance measuring area selective item in the distance measuring area auto-selection mode, it is lighted; if the central area is not selected, it is flickered.

As can be seen from the above description, whether or not the central distance measuring area is selected to be a distance measuring area selective item in the distance measuring area auto-selection mode can be changed over.

If the switch 7 is not turned on in step 40, it is determined that no change-over instruction for selection/non-selection of the central distance measuring area is input, and the flow advances to step 42.

[Step 42] The microcomputer PRS communicates with the switch detection & display circuit DDR to read the pulse input value from the dial 11. If no pulse input value is available, the flow returns to step 37 to repeat the above-mentioned routine for changing over whether the central distance measuring area is selected or not selected to be a distance measuring area selective item in the distance measuring area auto-selection mode. However, if the pulse input value is available, the flow advances to step 43 to execute a routine for changing over whether the right distance measuring area is selected or not selected to be a distance measuring area selective item in the distance measuring area auto-selection mode.

[Step 43] The microcomputer PRS checks if the right distance measuring area stored in the memory is selected to be a distance measuring area selective item in the distance measuring area auto-selection mode. If the right distance measuring area is selected, the flow advances to step 44.

[Step 44] The microcomputer PRS communicates with the switch detection & display circuit DDR to switch the display contents of the display DPS, thereby lighting only the right distance measuring area.

If the right distance measuring area is not selected to be a distance measuring area selective item in the distance measuring area auto-selection mode, the flow advances from step 43 to step 45.

[Step 45] The microcomputer PRS communicates with the switch detection & display circuit DDR to switch the display contents of the display DPS, thereby flickering only the right distance measuring area.

As can be seen from the above description, if the right distance measuring area is selected to be a distance measuring area selective item in the distance measuring area auto-selection mode, the right area is lighted; if the right area is not selected, it is flickered, and is distinguished from the selected area. The flow then advances to step 46.

[Step 46] The microcomputer PRS communicates with the switch detection & display circuit DDR to check if the switch 7 for selecting a distance measuring area is ON. In this state, the switch 7 for selecting a distance measuring area serves as a switch for changing over whether the corresponding distance measuring area is selected or not selected to be a distance measuring area selective item. If the switch 7 for selecting a distance measuring area is turned on (if a change-over instruction for selection/non-selection of the right distance measuring area is input), the flow advances to step 47.

[Step 47] When the right distance measuring area stored in the internal memory of the microcomputer PRS is selected to be a distance measuring area selective item in the distance measuring area auto-selection mode, the microcomputer PRS reverses its storage contents to "non-selection"; when it is not selected, the microcomputer PRS reverses its storage contents to "selection". Thereafter, the flow returns to step 43.

When the flow returns to step 43, the above-mentioned routine is repeated, and the display state of the right distance measuring area is changed based on the contents changed in step 47. That is, if the right area is selected to be a distance measuring area selective item in the distance measuring area auto-selection mode, it is lighted; if the right area is not selected, it is flickered.

As can be seen from the above description, whether or not the right distance measuring area is selected to be a distance measuring area selective item in the distance measuring area auto-selection mode can be changed over.

If the switch 7 is not turned on in step 46, it is determined that no change-over instruction for selection/non-selection of the right distance measuring area is input, and the flow advances to step 48.

[Step 48] The microcomputer PRS communicates with the switch detection & display circuit DDR to read the pulse input value from the dial 11. If no pulse input value is available, the flow returns to step 43 to repeat the above-mentioned routine for changing over whether the right distance measuring area is selected or not selected to be a distance measuring area selective item in the distance measuring area auto-selection mode. However, if the pulse input value is available, the flow returns to step 3 in FIG. 5, and the control escapes from the distance measuring area selective item selection routine in the distance area auto-selection mode.

Upon execution of the distance measuring area selective item selection routine in the distance area auto-selection mode described above, the microcomputer PRS stores, in its internal memory, an arbitrary combination of selective items of distance measuring areas to be automatically selected in the distance measuring area auto-selection mode.

Figure 6:
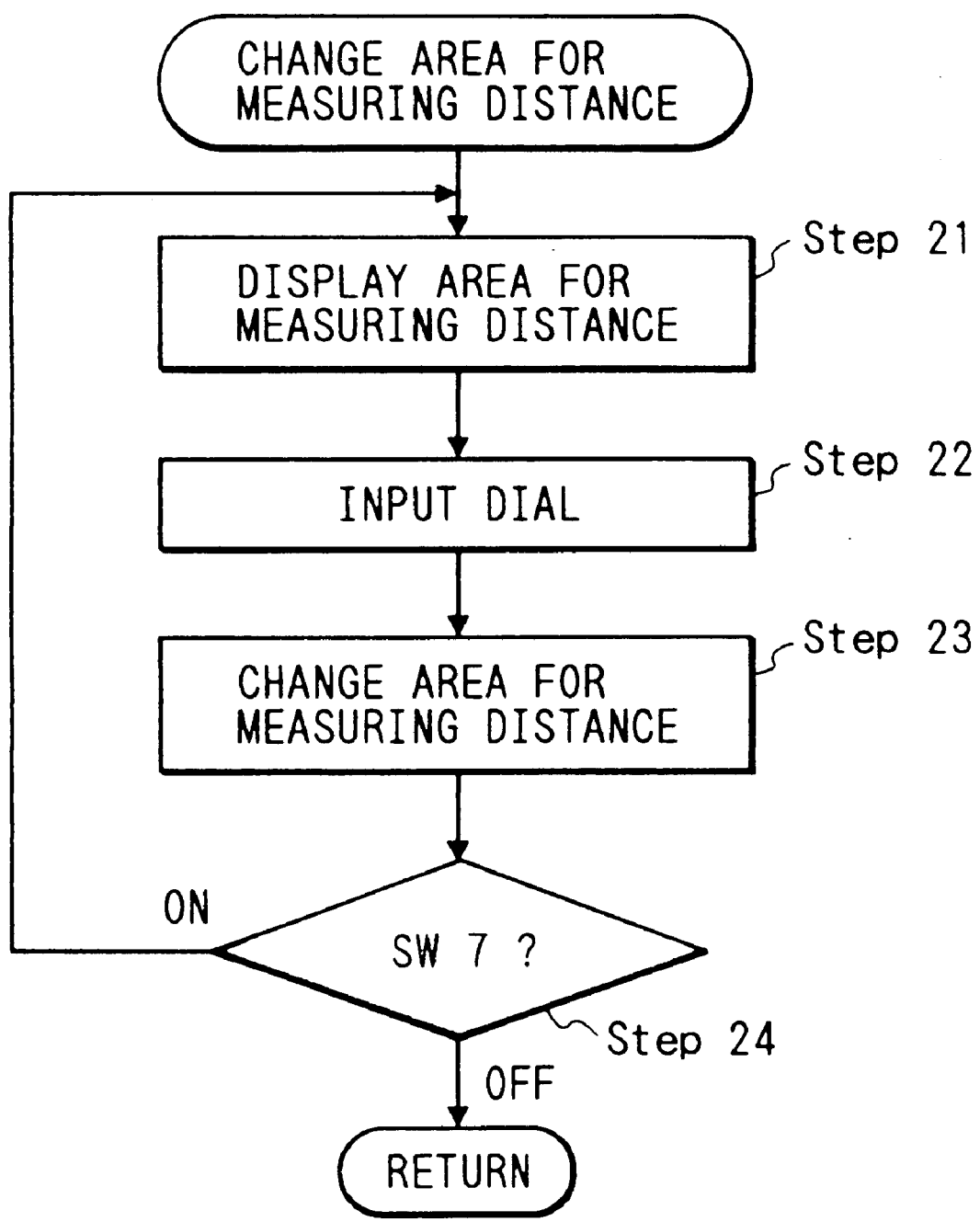
FIG. 6 is a flow chart showing the operation for changing a distance measuring area in step 6 in FIG. 5.
Figure 9F:
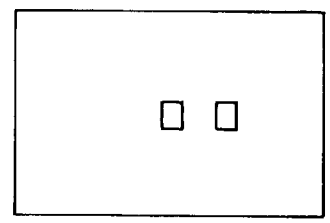
Figure 9B:
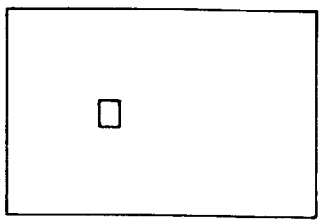
Figure 9G:
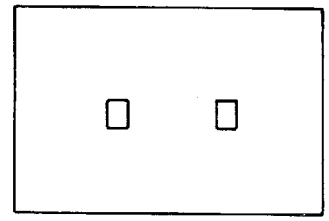
Figure 9C:
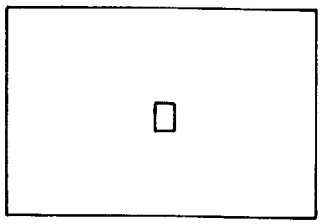
Figure 9D:
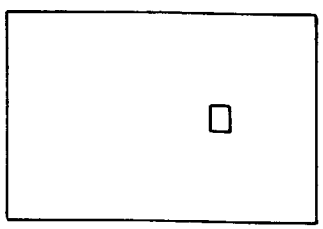
Figure 9E:
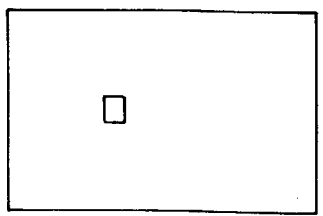

For example, if the central and right distance measuring areas are set to be selective items of distance measuring areas to be automatically selected, the distance measuring areas are displayed, as shown in FIG. 9F, in the distance measuring area auto-selection mode upon display of the selected distance measuring areas described in the flow chart of FIG. 6. In addition, if the right and left distance measuring areas are set to be selective items of distance measuring areas to be automatically selected, the distance measuring areas are displayed, as shown in FIG. 9G, in the distance measuring area auto-selection mode upon display of the selected distance measuring areas described in the flow chart of FIG. 6.

A description of the flow chart in FIG. 5 will be made again.

When the first stroke switch SW1 of the release switch 8 is turned on during execution of the above-mentioned routine from step 3 to step 5, the microcomputer PRS detects this ON operation in step 3, and the flow advances to step 8.

[Step 8] A distance measuring routine is executed.

Figure 8:
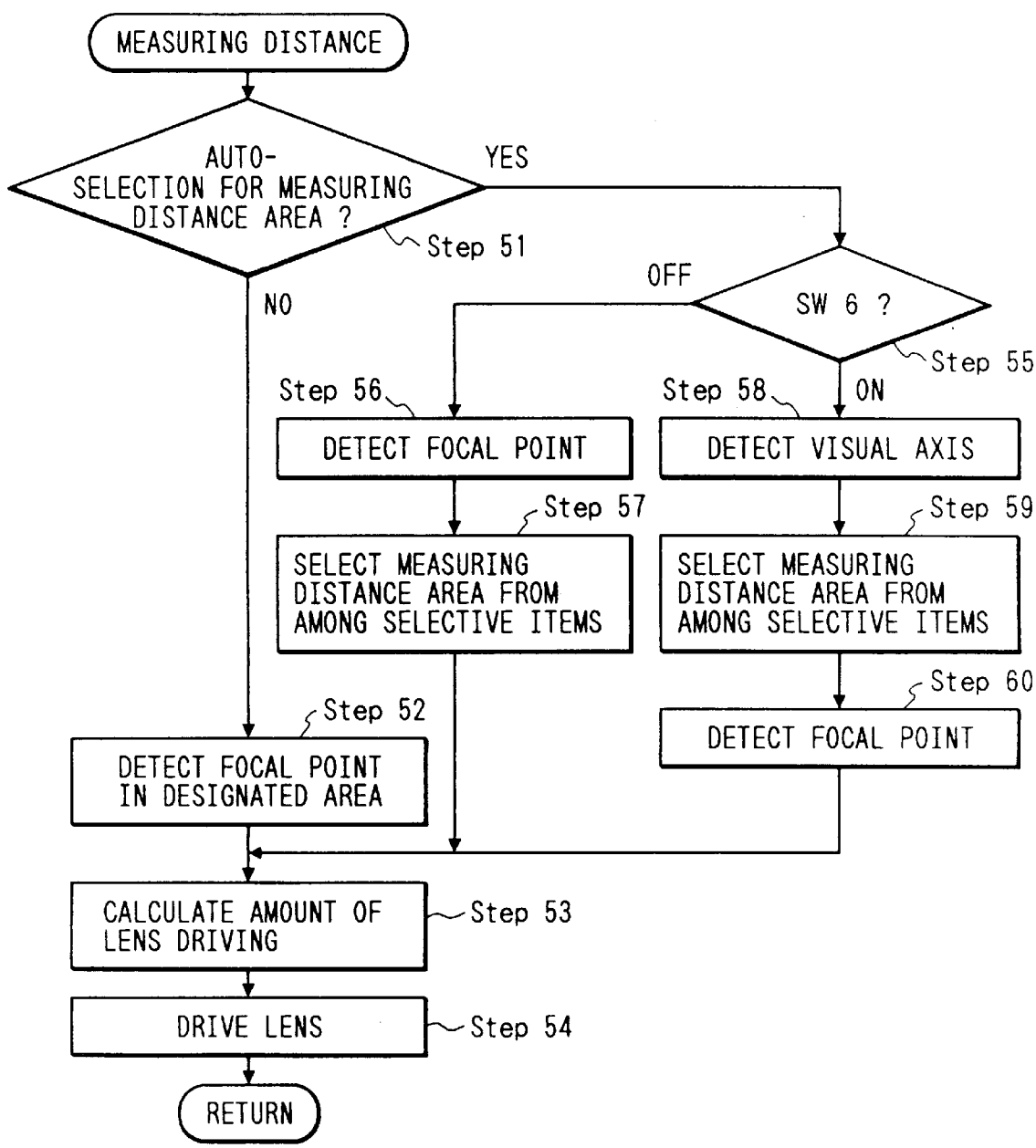
FIG. 8 is a flow chart showing the distance measuring operation in step 8 in FIG. 5.

The distance measuring routine will be described below with reference to the flow chart in FIG. 8.

[Step 51] The microcomputer PRS checks based on information of the distance measuring areas selected in step 6 above whether an arbitrary one distance measuring area is selected or the distance measuring area auto-selection mode is selected. If an arbitrary one distance measuring area is selected, the flow advances to step 52.

[Step 52] The microcomputer PRS controls the driving circuit SDR to drive the focus detection sensor device SNS, thus acquiring image data associated with the selected distance measuring area. The microcomputer PRS executes calculation processing of the acquired image data to obtain a defocus amount to an object.

[Step 53] The microcomputer PRS converts the defocus amount obtained in step 52 into a driving amount of the lens 1.

[Step 54] The microcomputer PRS supplies the lens driving amount obtained in step 53 and a focus lens driving command to the lens microcomputer LPRS, thus controlling the microcomputer LPRS to execute the lens driving operation.

Thus, the distance measuring operation ends. Upon completion of the distance measuring operation, the flow advances to step 9 in FIG. 5.

If it is determined in step 51 that the distance measuring area auto-selection mode is selected, the flow advances from step 51 to step 55.

[Step 55] The microcomputer PRS communicates with the switch detection & display circuit DDR to check the state of the switch 6 for setting whether or not distance measuring area auto-selection means by the visual axis detection means is selected to be distance measuring area auto-selection means. If the switch 6 is OFF, a mode for inhibiting distance measuring area selection using the visual axis detection means is selected, and the flow advances to step 56.

[Step 56] The microcomputer PRS controls the driving circuit SDR to drive the focus detection sensor device SNS, thus acquiring image data associated with all the distance measuring areas. The microcomputer PRS executes calculation processing of the acquired image data to obtain defocus amounts to an object in the corresponding distance measuring areas.

[Step 57] The microcomputer PRS determines a distance measuring area which is to be focused as a principal object on the basis of the defocus amounts to an object in the corresponding distance measuring areas obtained in step 56 in accordance with a predetermined algorithm described in, e.g., Japanese Laid-Open Patent Application Nos. 1-288812 and 1-288813. Upon determination of a distance measuring area, the microcomputer PRS determines it from those stored as the selective items in accordance with stored information in units of distance measuring areas which are stored in its internal memory as the distance measuring area selective items in the distance measuring area auto-selection mode in accordance with the flow charts shown in FIGS. 7A and 7B.

The flow then advances to step 53 and subsequent steps, and the distance measuring operation is completed based on the defocus amount to an object of the determined distance measuring area in the same manner as in a case wherein an arbitrary one distance measuring area is selected.

If it is determined in step 55 that the switch 6 is ON, a mode for performing distance measuring area selection using the visual axis detection means is selected, and the flow advances to step 58.

[Step 58] The microcomputer PRS controls the photoelectric conversion device EYESNS to access optical image data signals, and executes calculation processing for detecting the direction of the visual axis.

[Step 59] The microcomputer PRS determines a distance measuring area to be focused on the basis of the data of the direction of the visual axis obtained in step 58. Upon determination of a distance measuring area, the microcomputer PRS determines it from those stored as the selective items in accordance with stored information in units of distance measuring areas which are stored in its internal memory as the distance measuring area selective items in the distance measuring area auto-selection mode in accordance with the flow charts shown in FIGS. 7A and 7B.

[Step 60] The microcomputer PRS controls the driving circuit SDR to drive the focus detection sensor device SNS, thus acquiring image data associated with the distance measuring area determined in step 59. The microcomputer PRS executes calculation processing of the acquired image data to obtain a defocus amount to an object.

The flow then advances to step 53 and subsequent steps, and the distance measuring operation is completed based on the defocus amount to an object of the determined distance measuring area in the same manner as in a case wherein an arbitrary one distance measuring area is selected.

Upon completion of the distance measuring operation, the flow advances to step 9 in FIG. 5, as described above.

A description of the flow chart in FIG. 5 will be made again.

[Step 9] The microcomputer PRS reads the output from the photometry sensor SPC to acquire object luminance information, and determines a shutter speed and an aperture value so as to perform optimal exposure control. Furthermore, the microcomputer PRS communicates with the switch detection & display circuit DDR to output the determined information of the shutter speed and the aperture value thereto, so that the shutter speed and the aperture value are displayed on the display DPS.

[Step 10] The microcomputer PRS communicates with the switch detection & display circuit DDR to check if the second stroke switch SW2 of the release switch 8 is ON. If YES in step 10, the flow advances to step 11; otherwise, the flow returns to step 3 to repeat the above-mentioned flow.

[Step 11] The microcomputer PRS controls a shutter and motor to perform exposure. A detailed description thereof will be omitted since it is not directly related to the present invention.

[Step 12] The microcomputer PRS controls the motor to wind up a film. A detailed description thereof will also be omitted since it is not directly related to the present invention. Thereafter, the flow returns to step 3 to repeat the above-mentioned flow.

The description of the flow charts has been made.

The above embodiment has exemplified the arrangement of a camera with three distance measuring areas which are the minimum number of areas required for effectively practicing the present invention. Of course, the present invention is not limited to the arrangement of the camera with three distance measuring areas, but is effective for the arrangement of the camera with at least three distance measuring areas.

Cameras with four to five distance measuring areas have already been put into practical applications. For example, a case will be very briefly explained below wherein the present invention is applied to the arrangement of a camera with five distance measuring areas.

Figure 10A:
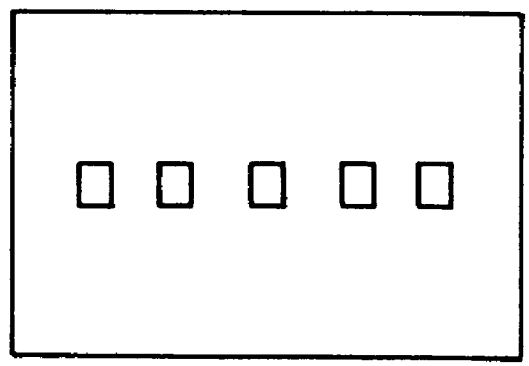
FIGS. 10A to 10C are views showing examples of a display in a finder, e.g., in a distance measuring area setting mode when the camera according to the embodiment of the present invention has five distance measuring areas.
Figure 10B:
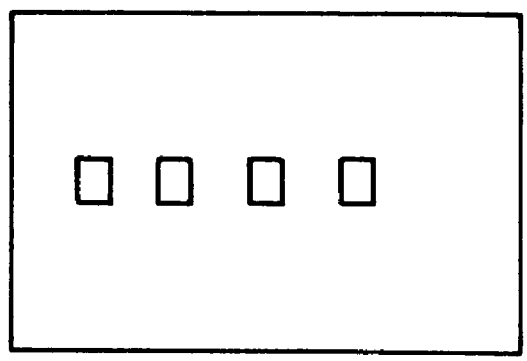
Figure 10C:
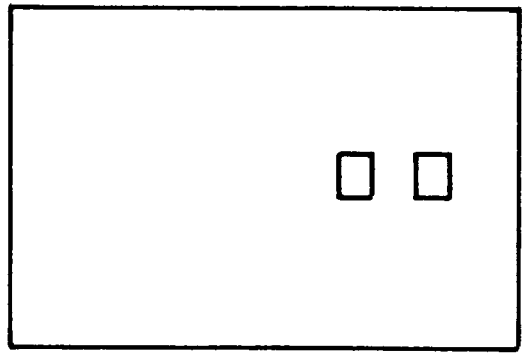

As shown in FIG. 10A, the camera has a total of five distance measuring areas. In the distance measuring area auto-selection mode, distance measuring area selection is -performed using all five distance measuring areas as selective items in the conventional camera. However, when the present invention is applied to the arrangement of the camera with five distance measuring areas, so that an arbitrary combination of distance measuring areas are stored in the internal memory of the microcomputer PRS as selective items in the distance measuring area auto-selection mode as in the first embodiment, a camera which has a distance measuring area auto-selection mode for automatically selecting an in-focus point from an arbitrary combination of the distance measuring areas can be provided, as shown in FIG. 10B or 10C.

According to this embodiment, in a mode for automatically selecting a distance measuring area to be focused from a plurality of focus detection systems (full-automatic photographing mode), distance measuring areas to be used in this mode are selected from all the distance measuring areas upon operation of the dial. In the auto-focus mode, a distance measuring area to be focused is determined from the selected distance measuring areas in accordance with a predetermined algorithm, and the lens is driven based on a defocus amount obtained from the determined distance measuring area. For this reason, even in the full-automatic photographing mode, a distance measuring area which is determined to be an unnecessary area by a photographer is excluded in distance measuring area selection. Therefore, an unintended distance measuring area will not be focused. When only one distance measuring area is designated in a photographing operation to eliminate this drawback, a principal object accidentally will not fall outside the designated distance measuring area, or the designated distance measuring area will not have a low contrast to produce an out-of-focus photograph. Thus, a camera with a very high focusing performance can be provided.

In this embodiment, when the distance measuring area auto-selection mode is selected, and a distance measuring area selection mode using the visual axis detection means is disabled at that time, the defocus amounts of all the distance measuring areas are calculated, and a distance measuring area to be focused is determined from distance measuring areas stored as the distance measuring area selective items in accordance with a predetermined algorithm. Then, the lens is driven based on the defocus amount corresponding to the determined distance measuring area. Alternatively, a distance measuring area to be focused may be determined first, and thereafter, the defocus amount of the determined area may be calculated to perform the lens driving operation.

What is claimed is:

1. A camera comprising:

an objective lens;

detection means for detecting defocus associated with each of at least three portions in a view field;

setting means for manually setting whether said each of said at least three portions is used for focusing or not; and means for automatically selecting a portion from among a plurality of said manually set portions to have been used for focusing, and for performing focusing for the selected portion by said objective lens.

2. A camera according to claim 1, wherein said detection means detects defocus of each of five portions of said view field.

3. A camera comprising:

an objective lens;

detection means for detecting defocus associated with each of at least three portions in a view field;

setting means for manually setting whether said each of at least three portions is used for focusing or not; and means for selecting a portion from among a plurality of said manually set portions to have been used for focusing, and for performing focusing for the selected portion by said objective lens.

4. A camera according to claim 3, wherein said detection means detects defocus of each of said five portions of said view field.

5. A camera according to claim 3, wherein said defocus detection means detects defocus of each of five portions of said view field.

6. A camera according to claim 3, wherein said camera has a first mode and a second mode for selecting a portion from among said plurality of portions and either said first mode or said second mode is used, and wherein said first mode is a mode for selecting said portion by visual axis and said second mode is a mode for automatically selecting said portion in accordance with an algorithm.

7. A camera according to claim 4, wherein said camera has a first mode and a second mode for selecting a portion from among said plurality of portions and either said first mode or said second mode is used, and wherein said first mode is a mode for selecting said portion by visual axis and said second mode is a mode for automatically selecting said portion in accordance with an algorithm.

8. An image pickup device comprising:

an imaging optical system;

detection means for detecting defocus associated with each of at least three portions in a view field;

setting means for manually setting whether said each of at least three portions is used for focusing or not; and means for selecting a portion from among a plurality of said manually set portions to have been used for focusing, and for performing focusing for the selected portion by said objective lens.

9. A device according to claim 8, wherein said detecting means detects defocus of each of five portions of said view field.

10. A camera comprising:

an objective lens;

defocus detection means for detecting defocus associated with each of at least three portions in a view field;

setting means for manually setting whether said each of at least three portions is used for focusing or not; and visual axis detecting means for detecting a direction of a visual axis of a user, to select a portion from among a plurality of said set portions to have been used for focusing by said setting means, and for performing focusing for the selected portion by said objective lens.

11. A camera according to claim 10, wherein said defocus detection means detects defocus of each of five portions of said view field.

* * * * *